(12) United States Patent
Stanjek et al.

(10) Patent No.: US 9,493,689 B2
(45) Date of Patent: Nov. 15, 2016

(54) CROSSLINKABLE COMPOSITIONS BASED ON ORGANYLOXYSILANE-TERMINATED POLYMERS

(71) Applicant: Wacker Chemie AG, Munich (DE)

(72) Inventors: Volker Stanjek, Ampfing (DE); Wolfram Schindler, Tuessling (DE); Elke Schwiebacher, Simbach (DE)

(73) Assignee: WACKER CHEMIE AG, Munich (DE)

( * ) Notice: Subject to any disclaimer, the term of this patent is extended or adjusted under 35 U.S.C. 154(b) by 71 days.

(21) Appl. No.: 14/389,471

(22) PCT Filed: Mar. 19, 2013

(86) PCT No.: PCT/EP2013/055596
§ 371 (c)(1),
(2) Date: Sep. 30, 2014

(87) PCT Pub. No.: WO2013/143905
PCT Pub. Date: Oct. 3, 2013

(65) Prior Publication Data
US 2015/0083324 A1    Mar. 26, 2015

(30) Foreign Application Priority Data
Mar. 30, 2012  (DE) .................. 10 2012 205 306

(51) Int. Cl.
| | | |
|---|---|---|
| *C09J 171/02* | (2006.01) | |
| *C08K 9/06* | (2006.01) | |
| *C09J 167/02* | (2006.01) | |
| *C08L 71/02* | (2006.01) | |
| *C08L 67/02* | (2006.01) | |
| *C08K 3/36* | (2006.01) | |
| *C08K 5/3415* | (2006.01) | |
| *C08K 5/5425* | (2006.01) | |
| *C08K 5/5455* | (2006.01) | |
| *C09D 5/34* | (2006.01) | |
| *C09J 5/00* | (2006.01) | |
| *C09J 11/04* | (2006.01) | |
| *C09K 3/10* | (2006.01) | |
| *C08G 65/336* | (2006.01) | |
| *C08G 77/445* | (2006.01) | |
| *C08G 77/46* | (2006.01) | |
| *C09J 183/10* | (2006.01) | |
| *C09J 183/12* | (2006.01) | |

(52) U.S. Cl.
CPC ............ *C09J 171/02* (2013.01); *C08G 65/336* (2013.01); *C08K 3/36* (2013.01); *C08K 5/3415* (2013.01); *C08K 5/5425* (2013.01); *C08K 5/5455* (2013.01); *C08K 9/06* (2013.01); *C08L 67/02* (2013.01); *C08L 71/02* (2013.01); *C09D 5/34* (2013.01); *C09J 5/00* (2013.01); *C09J 11/04* (2013.01); *C09J 167/02* (2013.01); *C09K 3/1018* (2013.01); *C08G 77/445* (2013.01); *C08G 77/46* (2013.01); *C09J 183/10* (2013.01); *C09J 183/12* (2013.01)

(58) Field of Classification Search
None
See application file for complete search history.

(56) References Cited

U.S. PATENT DOCUMENTS

| | | | |
|---|---|---|---|
| 6,451,437 B1 | 9/2002 | Amidaiji et al. | |
| 6,884,852 B1 | 4/2005 | Klauck et al. | |
| 7,153,357 B2 * | 12/2006 | Baumgart | C08G 18/6254 106/481 |
| 7,319,128 B2 | 1/2008 | Ziche et al. | |
| 7,414,086 B2 * | 8/2008 | Kimura | C08L 83/06 524/268 |
| 7,972,682 B2 | 7/2011 | Barthel et al. | |
| 8,101,704 B2 | 1/2012 | Baumann et al. | |
| 2007/0167598 A1 | 7/2007 | Stanjek et al. | |
| 2009/0042042 A1 * | 2/2009 | Yuki | B05D 5/00 428/447 |
| 2010/0087576 A1 | 4/2010 | Prasse | |
| 2012/0107626 A1 | 5/2012 | Schindler et al. | |
| 2013/0102738 A1 | 4/2013 | Stanjek et al. | |

FOREIGN PATENT DOCUMENTS

| | | |
|---|---|---|
| CN | 101712802 A | 5/2010 |
| DE | 102009027357 A1 | 1/2011 |
| EP | 1093482 B1 | 4/2001 |
| EP | 1535940 B1 | 6/2005 |
| EP | 1641854 B1 | 4/2006 |
| EP | 1896523 B1 | 3/2008 |
| EP | 2172523 A1 | 4/2010 |
| JP | 2010065073 A | 3/2010 |
| JP | 2010163554 A | 7/2010 |
| WO | 2006072407 A1 | 7/2006 |
| WO | 2011157562 A1 | 12/2011 |
| WO | 2012095826 A2 | 7/2012 |

* cited by examiner

*Primary Examiner* — Marc Zimmer
(74) *Attorney, Agent, or Firm* — Brooks Kushman P.C.

(57) ABSTRACT

Moisture curable silicone adhesives used for sealing joints and for the bonding of substrates such as PVC, concrete, mineral substrates, metals, glass, ceramic, wood, or painted surfaces are prepared from crosslinkable compositions containing both hydrophilic and hydrophobic fumed silicas in a mass ratio of 1:10 to 10:1.

21 Claims, No Drawings

CROSSLINKABLE COMPOSITIONS BASED ON ORGANYLOXYSILANE-TERMINATED POLYMERS

CROSS-REFERENCE TO RELATED APPLICATIONS

This application is the U.S. National Phase of PCT Appln. No. PCT/EP2013/055596 filed Mar. 19, 2013 which claims priority to German Appln. No. DE 10 2012 205 306.9 filed Mar. 30, 2012, the disclosures of which are incorporated in their entirely by reference herein.

BACKGROUND OF THE INVENTION

1. Field of the Invention

The invention relates to crosslinkable compositions of silane-crosslinking prepolymers, to methods of preparing them and to the use thereof as adhesives and sealants, especially for bonding of substrates.

2. Description of the Related Art

Polymer systems having reactive alkoxysilyl groups have long been known. On contact with water or air humidity, these alkoxysilane-terminated polymers are capable of condensing with one another with elimination of the alkoxy groups even at room temperature. One of the most important applications of such materials is the production of adhesives, especially of elastic adhesive systems.

Thus, adhesives based on alkoxysilane-crosslinking polymers in the cured state do not just exhibit good adhesion properties on some substrates, but also very good mechanical properties, since they can be both tear-resistant and highly elastic. A further crucial advantage of silane-crosslinking systems over numerous other adhesive and sealant technologies (for example over isocyanate-crosslinking systems) is the toxicological safety of the prepolymers.

In many applications, preference is given to one-component systems (1K systems) which cure on contact with air humidity. The crucial advantage of one-component systems is particularly the very easy applicability thereof, since no mixing of various adhesive components by the user is required. Besides time/labor savings and safely obviating any dosage errors, there is also no need to process the adhesive/sealant within the usually quite narrow time window in the case of one-component systems, as is the case of multicomponent systems after two components are mixed.

A disadvantage of these systems, according to the prior art, is especially the low reactivity of the corresponding MS or SPUR polymers toward moisture, which necessitates aggressive catalysis. The corresponding mixtures, therefore, typically contain considerable amounts of toxicologically unsafe tin catalysts.

It is advantageous to use α-silane-terminated prepolymers, which have reactive alkoxysilyl groups bonded by a methylene spacer to an adjacent urethane unit. The compounds of this class are highly reactive and require neither tin catalysts nor strong acids or bases to achieve high curing rates on contact with air. Commercially available α-silane-terminated prepolymers are GENIOSIL® STP-E10 or -E30 from Wacker-Chemie AG.

A further problem with many adhesive and sealant systems based on silane-crosslinking polyethers is the fact that they often do not have the desired rheological effects. Thus, on one hand, the materials have to have good applicability e.g. they have to be sufficiently free-flowing under the action of shear forces. On the other hand, the adhesive or sealant should have maximum firmness after application, at least in the majority of applications. Thus, the material should no longer be able to flow away from the desired application site, not even when the site is a vertical joint or weld seam. Moreover, the material should also retain its shape. This is especially true of joints or relatively thick weld seams not covered, for example, by facings. The surface of the adhesive or sealant is usually brought into the desired shape directly after application by the user and, at the same time, also smoothed. Thereafter, the surface should, however, necessarily retain its shape.

In order to achieve this desired profile of properties, the adhesive or sealant must not just fundamentally have thixotropic properties, but the thixotropy-related viscosity buildup must also happen relatively fast after the action of the shear forces has ended.

This is, where in particular transparent silane-crosslinking adhesive and sealant systems have so far had significant shortcomings. It is possible to achieve thixotropic properties with transparent silane-crosslinking systems by standard methods, especially by addition of a fumed silica. However, these properties are usually not sufficiently developed, or are lost under relatively high material shear. For instance, the corresponding materials no longer have these properties after an action of shear forces even if they had sufficient firmness before the action of shear forces. If the corresponding materials are exposed to strong shear forces, for example, in the course of dispensing into or discharge from the respective container, or even as early as during their production, they often exhibit unwanted flow characteristics.

Nontransparent filled systems are less critical in this regard because they usually have quite a high filler content, but further improvements in properties are, of course, always desirable.

SUMMARY OF THE INVENTION

The invention provides compositions (M) comprising
(A) 100 parts by weight of silane-crosslinking polymers of the formula $$Y-[(CR^1{}_2)_b-SiR_a(OR^2)_{3-a}]_x \qquad (I)$$

where
- Y represents an x-valent, nitrogen-, oxygen-, sulfur-, or carbon-bonded polymer radical containing at least one polyether unit or at least one polyester unit,
- R represents the same or different monovalent, optionally substituted hydrocarbyl radical,
- $R^1$ represents the same or different and is hydrogen or a monovalent, optionally substituted hydrocarbyl radical, which may be bonded to the carbon atom via nitrogen, phosphorus, oxygen, sulfur, or a carbonyl group,
- $R^2$ represents the same or different hydrogen or a monovalent, optionally substituted hydrocarbyl radical,
- x is an integer from 1 to 10, preferably 1, 2 or 3, more preferably 2 or 3, most preferably 2,
- a is 0, 1 or 2, preferably 0 or 1, and
- b is an integer from 1 to 10, preferably 1, 3 or 4, more preferably 1 or 3, most preferably 1, and (B) 5 to 100 parts by weight of fumed silica comprising
(B1) fumed hydrophilic silica and
(B2) fumed hydrophobic silica,
with the proviso that (B1) and (B2) are used in a mass ratio of 10:1 to 1:10.

DETAILED DESCRIPTION OF THE PREFERRED EMBODIMENTS

Examples of R radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radical; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl, and 2-propenyl radical; aryl radicals such as the phenyl, naphthyl, anthryl, and phenanthryl radical; alkaryl radicals such as o-, m-, and p-tolyl radicals; xylyl radicals; ethylphenyl radicals; and aralkyl radicals such as the benzyl radical, and the α- and β-phenylethyl radicals.

Examples of substituted R radicals are haloalkyl radicals such as the 3,3,3-trifluoro-n-propyl radical, the 2,2,2,2',2',2'-hexafluoroisopropyl radical, and the heptafluoroisopropyl radical, and haloaryl radicals such as the o-, m-, and p-chlorophenyl radical.

Preferably, the R radical is a monovalent hydrocarbyl radical, optionally substituted with halogen atoms and having 1 to 6 carbon atoms, more preferably with alkyl radicals having 1 or 2 carbon atoms, particularly the methyl radical.

Examples of $R^1$ radicals are hydrogen, the radicals specified for R, and optionally substituted hydrocarbyl radicals bonded to the carbon atom via nitrogen, phosphorus, oxygen, sulfur, carbon, or a carbonyl group. Preferably, the $R^1$ radical is a hydrogen atom and hydrocarbyl radicals having 1 to 20 carbon atoms, particularly, a hydrogen atom.

Examples of the $R^2$ radical are hydrogen or the examples cited for the R radical. Preferably, the $R^2$ radical is hydrogen or alkyl radicals, optionally substituted with halogen atoms and having 1 to 10 carbon atoms, more preferably alkyl radicals having 1 to 4 carbon atoms, particularly, the methyl and the ethyl radicals.

Examples of polymer radicals Y are polyester, polyether, or polyurethane radicals having at least one polyether or at least one polyester unit. The polymer chain in polymer radical Y preferably comprises polyoxyalkylenes such as polyoxyethylene, polyoxypropylene, polyoxybutylene, polyoxytetramethylene, poly-oxyethylene-polyoxypropylene copolymer, and polyoxypropylene-polyoxybutylene copolymer; polyester or polyurethanes based on polyether or polyester, which are preferably bonded via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR'— to the —[(CR$^1_2$)$_b$—SiR$_a$(OR$^2$)$_{3-a}$] group(s), where R' is the same or different and has a definition given for R or is a —CH(COOR")—CH$_2$—COOR" group, in which R" may be identical or different and has a definition given for R.

The R' radical is preferably a —CH(COOR")—CH$_2$—COOR" group or an optionally substituted hydrocarbyl radical having 1 to 20 carbon atoms, more preferably a linear, branched or cyclic alkyl group having 1 to 20 carbon atoms, or an aryl group optionally substituted by halogen atoms and having 6 to 20 carbon atoms. Examples of R' radicals are cyclohexyl, cyclopentyl, n- and isopropyl, n-, iso- and t-butyl, the various stereoisomers of the pentyl radical, hexyl radical or heptyl radical, and the phenyl radical.

The R" radicals are preferably alkyl groups having 1 to 10 carbon atoms, more preferably methyl, ethyl, or propyl radicals.

Component (A) may have the —[(CR$^1_2$)$_b$—SiR$_a$(OR$^2$)$_{3-a}$] groups attached as described at any desired position of the polymer, for example internally and/or terminally. The polymers (A) can be prepared by known methods such as addition reactions, e.g. hydrosilylation, Michael addition, Diels-Alder addition or reactions between isocyanate-functional compounds and compounds having isocyanate-reactive groups, preferably the latter.

More preferably, the Y radical in formula (I) is x-valent, nitrogen-, oxygen-, sulfur-, or carbon-bonded polyether group-containing polyurethane radicals and polyoxyalkylene radicals, especially polyoxyalkylene radicals.

When Y represents polyurethane radicals, preference is given to those whose chain ends are bonded via —NH—C(=O)O—, —NH—C(=O)—NH—, —NR'—C(=O)—NH— or —NH—C(=O)—NR'—, especially via —O—C(=O)—NH— or —NH—C(=O)—NR'—, to the —[(CR$^1_2$)$_b$—SiR$_a$(OR$^2$)$_{3-a}$] group(s), where all the radicals and indices have one of the abovementioned meanings. These polyurethane radicals Y are preferably obtainable from linear or branched polyoxyalkylenes, especially from polypropylene glycols, and di- or polyisocyanates. These Y radicals preferably have average molar masses $M_n$ from 10,000 to 30,000 g/mol, more preferably from 11,000 to 20,000 g/mol. Suitable methods for preparing a corresponding component (A), and also examples of component (A) itself, are described, inter alia, in EP 1 093 482 B1 (paragraphs [0014]-[0023], [0039]-[0055] and example 1 and comparative example 1) or EP 1 641 854 B1 (paragraphs [0014]-[0035], examples 4 and 6 and comparative examples 1 and 2), which are incorporated herein by reference.

When Y represents polyoxyalkylene radicals, it preferably represents linear or branched polyoxyalkylene radicals, more preferably polyoxypropylene radicals whose chain ends are preferably bonded via —O—C(=O)—NH— to the —[(CR$^1_2$)$_b$—SiR$_a$(OR$^2$)$_{3-a}$] group(s). The polyoxyalkylene radicals Y preferably have average molar masses $M_n$ from 10,000 to 30,000 g/mol, more preferably from 11,000 to 20,000 g/mol. Suitable processes for preparing a corresponding component (A), and also examples of component (A) itself, are described, inter alia, in EP 1 535 940 B1 (paragraphs [0005]-[0025] equivalent to U.S. Pat. No. 7,319,128 and examples 1-3 and comparative examples 1-4) or EP 1 896 523 B1 (paragraphs [0008]-[0047]) equivalent to U.S. Pat. No. 8,101,704, which are incorporated herein by reference.

The number average molar mass $M_n$ can be determined by means of size exclusion chromatography (SEC) against a polystyrene standard, in THF, at 60° C., flow rate 1.2 ml/min, and RI detection (refractive index detector) on a Styragel HR3-HR4-HR5-HR5 column set from Waters Corp., USA, with an injection volume of 100 μl.

The end groups of compounds (A) used are preferably those of the general formulae

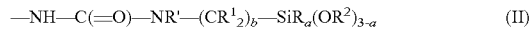

$$—NH—C(=O)—NR'—(CR^1_2)_b—SiR_a(OR^2)_{3-a} \quad (II)$$

and

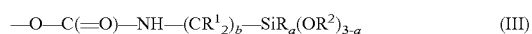

$$—O—C(=O)—NH—(CR^1_2)_b—SiR_a(OR^2)_{3-a} \quad (III)$$

where the radicals and indices have any of the meanings recited above. The end groups of compounds (A) used are more preferably those of the formula (III).

Preferably, component (A) comprises silane-terminated polyoxyalkylenes, more preferably silane-terminated polyoxypropylenes, having end groups of the formula (III), where $R^2$ is hydrogen, R is a methyl radical, $R^2$ is a methyl or ethyl radical, b is 1 or 3, and a is 0 or 1. These silane-terminated polyoxyalkylenes, apart from the end groups (III), preferably contain exclusively polyether units. Preferably, polymers (A) have 2 or 3, more preferably 2, end groups of the formula (III) per molecule.

An immense advantage of silane-terminated polyoxyalkylenes having end groups of the formula (III) over silane-terminated polyoxyalkylenes having different end groups is their sheer simplicity of preparation through a reaction of common hydroxyl terminated polyoxyalkylenes and silanes of the formula

$$OCN-(CR^1_2)_b-SiR_a(OR^2)_{3-a} \qquad (IV)$$

where all the radicals and indices have any of the above-mentioned meanings. What is crucial is that this reaction provides for a substantially complete termination of existing chain ends making this method significantly different from other methods, for example, a hydrosilylation of α,ω-unsaturated polymers with SiH-functional silanes.

This substantially complete termination surprisingly leads to distinctly better properties, especially to distinctly better tensile strengths, of the compositions (M) containing the polymers (A), compared to polymers whose end groups have been prepared in another way, for example via hydrosilylation.

The silane-terminated polymers (A) are preferably those wherein the chain ends have been terminated at least to an extent of 85%, more preferably at least to an extent of 90%, most preferably at least to an extent of 95% with end groups of the formula (III). More preferably components (A) are linear polyoxypropylenes, wherein the chains are terminated at least to an extent of 85%, more preferably at least to an extent of 90%, most preferably at least to an extent of 95% with end groups of the formula (III).

The average molecular weights $M_n$ of the compounds (A) are preferably at least 10,000 g/mol, more preferably at least 11,000 g/mol, and preferably at most 30,000 g/mol, more preferably at most 24,000 g/mol, most preferably at most 22,000 g/mol.

The viscosity of the compounds (A) is preferably at least 0.2 Pas, preferably at least 1 Pas, more preferably at least 5 Pas, and preferably at most 700 Pas, more preferably at most 100 Pas, measured in each case at 20° C.

Component (A) may contain just one kind of compound of the formula (I) or mixtures of different kinds of compounds of the formula (I). This component (A) may contain exclusively compounds of the formula (I) in which more than 90%, preferably more than 95%, and more preferably more than 98% of all the silyl groups bonded to the Y radical are identical. Alternatively, it is possible to use a component (A) at least partly containing compounds of the formula (I) in which different silyl groups are bonded to a Y radical. Lastly, it is also possible to use, as component (A), mixtures of various compounds of the formula (I) containing at least 2 different kinds of silyl groups bonded to Y radicals, although all the silyl groups bonded to each Y radical are identical.

If component (A) comprises different kinds of compounds of the formula (I), preference is given to mixtures containing both compounds (A1), having end groups of the formula (II) or (III), in which b=1 and $R^2$=H, and a=0 or 1 and compounds (A2), having end groups of the formula (II) or (III), in which b=3 and $R^2$=H, and a=0, and particular preference to those in which the weight ratio of (A1) to (A2) is 0.1 to 10, preferably 0.2 to 5.

In a preferred embodiment of the invention, component (A) is a mixture containing at least one compound (A1) having end groups of the formula (III) in which b=1, $R^2$=H, a=1, and $R^2$=CH$_3$, and at least one compound (A2) having end groups of the formula (III) in which b=3, $R^1$=H, a=0, and $R^2$=CH$_3$, with a weight ratio of (A1) to (A2) preferably being 0.1 to 10, more preferably 0.2 to 5.

The compounds (A) used in accordance with the invention are commercial products or can be prepared by standard chemical methods. Examples of commercially available compounds (A) are GENIOSIL® STP-E 10, STP-E 15, STP-E 30, or STP-E 35 products from Wacker Chemie AG.

Preferably, the compositions (M) contain compounds (A) in concentrations of at most 75% by weight, more preferably at most 65% by weight, and preferably at least 10% by weight, more preferably at least 15% by weight, based in each case on the total weight of the composition (M).

The fumed silicas in component (B) may be any suitable type of fumed silica. The fumed silicas in component (B) are commercial products or can be prepared by standard chemical methods. For example, the fumed silicas used can be prepared by hydrolysis or oxidation of volatile chlorosilanes in a hydrogen/oxygen gas flame. Optionally, the product obtained is subjected to one or more additional aftertreatment steps, for example a mechanical compaction or grinding operation, which can be conducted in, for example, pin mills or sifter mills.

The hydrophilic fumed silicas (B1) have a methanol number of preferably below 30, more preferably below 15, most preferably of 0. The hydrophobic fumed silicas (B2) have a methanol number of preferably at least 30, more preferably above 40, most preferably above 50. The term "methanol number" means percentage (% by weight) of methanol in the water/methanol mixture at which half of the silica has been wetted and has sunk into the liquid at 25° C. and 1,013 hPa.

Thus, hydrophobic silica is barely wetted, if at all, by water; this leads to flotation of the hydrophobic silica on top of the water, even after shaking. The addition of methanol to water lowers the surface tension of the mixture compared to pure water. If the surface tension (mN/m) of the water/methanol mixture is of the same magnitude as the surface energy (mJ/m$^2$) of the silica, the silica is wetted and sinks into the water/methanol mixture. For this to happen, the less polar the silica is, the higher methanol content, i.e. the methanol number is required.

The methanol number determination can be conducted as follows: the water/methanol mixture to be tested in each case is covered with the same volume of silica at 25° C. and 1,013 hPa. This is followed by intensive mixing by vigorous shaking for a period of 5 minutes. After the mixture rested for 10 minutes, the amount of silica which has sunk is determined. If the result is sufficiently clear, a visual determination by the naked eye is sufficient; if in doubt, the sunk and floating silica fractions have to be separated from one another, dried, and weighed. If more than half the weight of the silica has sunk, the methanol number is less than or equal to the value tested. The test is repeated with different water/methanol weight ratios until the methanol number, which is always between the highest methanol content tested at which there is no wetting and the smallest methanol content tested at which there is wetting, has been determined with the appropriate desired accuracy.

The hydrophilic silica (B1) is preferably a silica of a hydrophilicity which has not been reduced by an additional treatment with a hydrophobizing agent after production in the hydrogen/oxygen gas flame. Preferably, the silica has not been subjected to any additional chemical treatment after production in the hydrogen/oxygen gas flame. The hydrophilic silica (B1) has a carbon content of preferably not more than 0.3% by weight, more preferably not more than 0.1% by weight. In particular, preference is given to a hydrophilic silica (B1) in which no carbon is detectable.

The hydrophobic silica (B2) is preferably a silica of a hydrophilicity which has been reduced by an additional treatment with a hydrophobizing agent after production in the hydrogen/oxygen gas flame. Since the hydrophobizing agent for preparation of the hydrophobic silica (B2) contains carbon, the hydrophobic silica (B2) has a carbon content of preferably more than 0.3% by weight, more preferably 0.5 to 15% by weight, most preferably 0.5 to 10% by weight.

Suitable hydrophobizing agents for preparation of the hydrophobic silica (B2) are described in WO 2006/072407 (page 8, line 22 to page 12, line 20). Suitable methods for preparation of the hydrophobic silica (B2) are described in WO 2006/072407 (page 12, line 22 to page 15, line 20). The cited text passages from WO 2006/072407 are incorporated herein by reference.

The hydrophilic fumed silica (B1) preferably consists of high-purity amorphous silicon dioxide.

Component (B) used is at least one hydrophilic fumed silica (B1) and at least one hydrophobic fumed silica (B2), where (B1) and (B2) are present in a mass ratio of preferably 5:1 to 1:5, more preferably of 3:1 to 1:3, most preferably of 2:1 to 1:2 in the composition (M). Preferably no further constituents are used as component (B) in addition to (B1) and (B2).

The specific BET surface areas (measured by DIN 66131 and DIN 66132) of the hydrophilic silicas (B1) are preferably between 10 and 500 m²/g, more preferably between 30 and 400 m²/g, most preferably between 50 and 400 m²/g. The specific BET surface areas (measured to DIN 66131 and DIN 66132) of the hydrophobic silicas (B2) are preferably between 10 and 500 m²/g, more preferably between 30 and 400 m²/g, most preferably between 30 and 300 m²/g. The silicas (B) occur in the form of hard sinter aggregates, which in turn form agglomerates.

The mean particle sizes of the agglomerates of the silicas (B) are preferably between 1 and 40 µm, more preferably between 5 and 25 µm, measured by laser diffraction on dispersions in a suitable solvent, for example, isopropanol.

The mean particle sizes of the sinter aggregates of the silicas (B) are preferably between 1 and 1000 nm, more preferably between 100 and 500 nm, and most preferably between 100 and 300 nm, measured by photon correlation spectroscopy.

Examples of component (B1) are hydrophilic fumed silicas, obtainable as HDK® D05, HDK® C10, HDK® S13, HDK® V15, HDK® V15P, HDK® N20, HDK® N20P, HDK® T30, or HDK® T40 from Wacker Chemie AG, Munich, Germany. Examples of component (B2) are hydrophobic fumed silicas, obtainable as HDK® H15, HDK® H20, HDK® H30, HDK® H18, H20RH, or HDK® H2000 from Wacker Chemie AG, Munich, Germany. The silicas (B1) and (B2) independently have a moisture content of preferably below 1% by weight, more preferably below 0.5% by weight.

In a preferred embodiment of the invention, compositions (M) contain component (B) in the amount 10 to 80 parts by weight, more preferably 15 to 50 parts by weight, based in each case on 100 parts by weight of component (A).

The compositions may, as well as the polymers (A) and component (B), also contain further constituents, for example, unreactive plasticizers (C), basic nitrogen-containing organosilicon compound (D), further fillers (E), silicone resins (F), catalysts (G), adhesion promoters (H), water scavengers (I), additives (J), and admixtures (K).

Examples of plasticizers (C) are phthalic esters, for example dioctyl phthalate, diisooctyl phthalate, and diundecyl phthalate; perhydrogenated phthalic esters, for example diisononyl 1,2-cyclohexanedi-carboxylate and dioctyl 1,2-cyclohexanedicarboxylate; adipic esters, for example dioctyl adipate; trimellitates, for example trioctyl trimellitate or tri(2-ethylhexyl)trimellitate, benzoic esters; glycol esters; esters of saturated alkanediols, for example 2,2,4-trimethyl-1,3-pentanediol monoisobutyrate and 2,2,4-trimethyl-1,3-pentanediol diisobutyrate; phosphoric esters; sulfonic esters; polyesters; polyethers, for example, polyethylene glycols, poly-THF and polypropylene glycols having molar masses of preferably 200 to 22,000 g/mol; polystyrenes; polybutadienes; polyisobutylenes; paraffinic hydrocarbons and branched hydrocarbons with high molecular weight.

Preferably, component (C) optionally used comprises phthalic esters, adipic esters, benzoic esters, glycol esters, esters of saturated alkanediols, phosphoric esters, sulfonic esters, polyesters, polyethers, polystyrenes, polybutadienes, polyisobutylenes, paraffinic hydrocarbons and high molecular weight, branched hydrocarbons.

Preference is given to using plasticizers (C) having molar masses, or in case of polymeric plasticizers average molar masses $M_n$, greater than 200 g/mol, more preferably greater than 500 g/mol, most preferably greater than 900 g/mol. They preferably have molar masses or average molar masses $M_n$ not more than 20,000 g/mol, more preferably not more than 10,000 g/mol, most preferably not more than 8,000 g/mol.

If the compositions (M) comprise plasticizers (C), the amounts are preferably at least 5 parts by weight, more preferably at least 10 parts by weight, most preferably at least 20 parts by weight, based in each case on 100 parts by weight of component (A). Preferably, the compositions (M) comprise plasticizers (C) in amounts of not more than 200 parts by weight, more preferably in amounts of not more than 150 parts by weight, most preferably not more than 100 parts by weight, based in each case on 100 parts by weight of component (A). The compositions (M) preferably comprise component (C).

Preferably, optional component (D) comprises organosilicon compounds containing units of the formula

$$D_c Si(OR^3)_d R^4_e O_{(4-c-d-e)/2} \qquad (V)$$

in which
R³ may be identical or different and is hydrogen or optionally substituted hydrocarbyl radicals,
D may be identical or different and is monovalent, SiC-bonded radical having basic nitrogen,
R⁴ may be identical or different and is monovalent, optionally substituted SiC-bonded organic radical free of basic nitrogen,
c is 0, 1, 2, 3, or 4, preferably 1,
d is 0, 1, 2, or 3, preferably 1, 2, or 3, more preferably 2 or 3, and
e is 0, 1, 2, or 3, preferably 1 or 0,
with the proviso that the sum total of c+d+e is less than or equal to 4 and at least one D radical per molecule is present.

The organosilicon compounds (D) may either be silanes, i.e. compounds of the formula (V) with c+d+e=4, or siloxanes, i.e. compounds containing units of the formula (V) with c+d+e<3, preferably silanes.

Examples of optionally substituted hydrocarbyl radicals $R^3$ are the examples given for the R radical. The $R^3$ radical is preferably hydrogen or hydrocarbyl radicals optionally substituted by halogen and having 1 to 18 carbon atoms, more preferably hydrogen or hydrocarbyl radicals having 1 to 10 carbon atoms, especially methyl and ethyl radicals.

Examples of $R^4$ radicals are the examples given for R. The $R^4$ radical is preferably hydrocarbyl radicals optionally substituted by halogen and having 1 to 18 carbon atoms, more preferably hydrocarbyl radicals having 1 to 5 carbon atoms, especially the methyl radical.

Examples of D radicals are radicals of the formula $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N$—$CH_2$—$CH(CH_3)$—$CH_2$—, $H_2N(CH_2)_5$—, cyclo-$C_5H_9NH(CH_2)_3$—, cyclo-$C_6H_{11}NH(CH_2)_3$—, phenyl-$NH(CH_2)_3$—, $(CH_3)_2N(CH_2)_3$—, $(C_2H_5)_2N(CH_2)_3$—, $(C_3H_7)_2NH(CH_2)_3$—$(C_4H_9)_2NH(CH_2)_3$—, $(C_5H_{11})_2NH(CH_2)_3$—, $(C_6H_{13})_2NH(CH_2)_3$—$(C_7H_{15})_2NH(CH_2)_3$—, $H_2N(CH_2)$—, $H_2N(CH_2)NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-$NH(CH_2)$—, $(CH_3)_2N(CH_2)$—, $(C_2H_5)_2N(CH_2)$—, $(C_3H_7)_2NH(CH_2)$—, $(C_4H_9)_2NH(CH_2)$—, $(C_5H_{11})_2NH(CH_2)$—, $(C_6H_{13})_2NH(CH_2)$—, $(C_7H_{15})_2NH(CH_2)$—, $(CH_3O)_3Si(CH_2)_3NH(OH_2)_3$—, $(C_2H_5O)_3Si(CH_2)_3NH(CH_2)_3$—, $(CH_3O)_2(CH_3)Si(CH_2)_3NH(CH_2)_3$—, and $(C_2H_5O)_2(CH_3)Si(CH_2)_3NH(CH_2)_3$—, and reaction products of the abovementioned primary amino groups with compounds containing epoxy groups or carbon-carbon double bonds reactive toward primary amino groups. Preferably, the D radical is the $H_2N(CH_2)_3$—, $H_2N(CH_2)_2NH(CH_2)_3$—, or cyclo-$C_6H_{11}NH(CH_2)_3$— radical.

Examples of the silanes of the formula (V) are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3$—$Si(OCH_3)_3$, $H_2N(CH_2)_2NH(CH_2)_2NH(CH_2)_3$—$Si(OC_2H_5)_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, phenyl-$NH(CH_2)_3$—$Si(OCH_3)_3$, phenyl-$NH(CH_2)_3$—$Si(OC_2H_5)_3$, phenyl-$NH(CH_2)_3$—$Si(OCH_3)_2CH_3$, phenyl-$NH(CH_2)_3$—$Si(OC_2H_5)_2CH_3$, phenyl-$NH(CH_2)_3$—$Si(OH)_3$, phenyl-$NH(CH_2)_3$—$Si(OH)_2CH_3$, $HN((CH_2)_3$—$Si(OCH_3)_3)_2$, $HN((CH_2)_3$—$Si(OC_2H_5)_3)_2$,$HN((CH_2)_3$—$Si(OCH_3)_2CH_3)_2$, $HN((CH_2)_3$—$Si(OC_2H_5)_2CH_3)_2$, cyclo-$C_6H_{11}NH(CH_2)$—$Si(OCH_3)_3$, cyclo-$C_6H_{11}NH(CH_2)$—$Si(OC_2H_5)_3$, cyclo-$C_6H_{11}NH(CH_2)$—$Si(OCH_3)_2CH_3$, cyclo-$C_6H_{11}NH(CH_2)$—$Si(OC_2H_5)_2CH_3$, cyclo-$C_6H_{11}NH(CH_2)$—$Si(OH)_3$, cyclo-$C_6H_{11}NH(CH_2)$—$Si(OH)_2CH_3$, phenyl-$NH(CH_2)$—$Si(OCH_3)_3$, phenyl-$NH(CH_2)$—$Si(OC_2H_5)_3$, phenyl-$NH(CH_2)$—$Si(OCH_3)_2CH_3$, phenyl-$NH(CH_2)$—$Si(OC_2H_5)_2CH_3$, phenyl-$NH(CH_2)$—$Si(OH)_3$, and phenyl-$NH(CH_2)$—$Si(OH)_2CH_3$, and the partial hydrolyzates thereof, preference being given to $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OC_2H_5)_3$, and cyclo-$C_6H_{11}NH(CH_2)_3$—$Si(OCH_3)_2CH_3$, and the partial hydrolyzates of each, and particular preference to $H_2N(CH_2)_2NH(CH_2)_3$—$Si(OCH_3)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OCH_3)_2CH_3$, and the partial hydrolyzates of each.

The optionally used organosilicon compounds (D) may also assume the function of a curing catalyst or a cocatalyst in the compositions (M) or act as adhesion promoters and/or as water scavengers. The optionally used organosilicon compounds (D) are commercial products or are preparable by standard chemical methods.

If the compositions (M) comprise component (D), the amounts are preferably 0.01 to 25 parts by weight, more preferably 0.1 to 10 parts by weight, most preferably 0.5 to 5 parts by weight, based in each case on 100 parts by weight of component (A). The compositions (M) preferably comprise component (D).

The optional fillers (E) used in the compositions (M) may be any suitable fillers that are different than component (B) or (B1) and (B2). Examples of fillers (E) are non-reinforcing fillers, i.e. fillers having a BET surface area of preferably up to 50 m$^2$/g such as quartz, diatomaceous earth, calcium silicate, zirconium silicate, talc, kaolin, zeolites, metal oxide powders such as aluminum oxides, titanium oxides, iron oxides, or zinc oxides, or the mixed oxides thereof, barium sulfate, calcium carbonate, gypsum, silicon nitride, silicon carbide, boron nitride, glass and polymer powder such as polyacrylonitrile powder; reinforcing fillers, i.e. fillers having a BET surface area of more than 50 m$^2$/g, such as precipitated chalk, carbon black such as furnace black and acetylene black, and mixed silicon-aluminum oxides of high BET surface area; aluminum trihydroxide, fillers in the form of hollow spheres such as ceramic microbeads, for example, those obtainable as Zeeospheres™ from 3M Deutschland GmbH in Neuss, Germany, elastic polymer beads, for example, those obtainable as EXPANCEL® from AKZO NOBEL, Expancel in Sundsvall, Sweden, or glass beads; fibrous fillers such as asbestos and polymer fibers. The fillers mentioned may be hydrophobized, for example, by treatment with organosilanes or -siloxanes or with stearic acid, or by etherification of hydroxyl groups to alkoxy groups.

If the compositions (M) comprise fillers (E), these are preferably calcium carbonate, talc, or aluminum trihydroxide.

Any fillers (E) have a moisture content of preferably less than 1% by weight, more preferably less than 0.5% by weight.

If the compositions (M) contain fillers (E), the amounts are preferably 10 to 1,000 parts by weight, more preferably 50 to 500 parts by weight, most preferably 70 to 200 parts by weight, based in each case on 100 parts by weight of constituent (A). The compositions (M) preferably do not contain any fillers (E).

The inventive compositions (M) are preferably substantially transparent.

Any silicone resins (F) used in the compositions (M) are preferably organopolysiloxane resins consisting essentially, preferably exclusively, of T units of the formulae $PhSiO_{3/2}$, $PhSi(OR^6)O_{2/2}$ and $PhSi(OR^6)_2O_{1/2}$, where Ph is a phenyl radical and $R^6$ may be identical or different hydrogen or alkyl radicals, optionally substituted by halogen and having 1 to 10 carbon atoms, more preferably a hydrogen or alkyl radicals having 1 to 4 carbon atoms.

The silicone resins (F) have an average molar mass (number average) $M_n$ preferably at least 400 g/mol and more preferably at least 600 g/mol. The average molar mass $M_n$ is preferably at most 400,000 g/mol, more preferably at most 100,000 g/mol, most preferably at most 50,000 g/mol. They may be either solid or liquid at 23° C. and 1,000 hPa, preference being given to liquid silicone resins (F).

The silicone resins usable as components (F) are commercial products, for example various SILRES® products from Wacker Chemie AG, such as SILRES® IC 368, SILRES® IC 678, or SILRES® SY231, or are preparable by standard chemical methods.

If the compositions (M) contain silicone resins (F), the amounts are preferably 0.1 to 100 parts by weight, more preferably 0.2 to 50 parts by weight, most preferably 0.5 to 20 parts by weight, based in each case on 100 parts by weight of component (A). The compositions (M) preferably do not contain any silicone resins (F).

Any catalysts (G) used in the compositions (M) may be any suitable catalysts for compositions that cure through silane condensation and are different than component (D).

Examples of metal-containing curing catalysts (G) are organic titanium and tin compounds, for example, titanic esters such as tetrabutyl titanate, tetrapropyl titanate, tetraisopropyl titanate, and titanium tetraacetylacetonate; tin compounds such as dibutyltin dilaurate, dibutyltin maleate, dibutyltin diace-tate, dibutyltin dioctanoate, dibutyltin acetylacetonate, dibutyltin oxides, and corresponding dioctyltin compounds.

Examples of metal-free curing catalysts (G) are basic compounds such as triethylamine, tributylamine, 1,4-diazabi-cyclo[2.2.2]octane, 1,5-diazabicyclo[4.3.0]non-5-ene, 1,8-diazabicyclo[5.4.0]undec-7-ene, N,N-bis(N,N-dimethyl-2-amino-ethyl)methylamine, N,N-dimethylcyclo-hexylamine, N,N-dimethyl-phenylamine, and N-ethylmorpholinine.

It is likewise possible to use acidic compounds such as phosphoric acid and esters thereof, toluenesulfonic acid, sulfuric acid, nitric acid, or organic carboxylic acids, for example, acetic acid and benzoic acid as catalyst (G).

In one embodiment of the invention, any catalysts (G) are metal-containing curing catalysts, preferably tin-containing catalysts. This embodiment of the invention is preferred, especially when component (A) consists entirely or at least partly, i.e. to an extent of at least 90% by weight, preferably to an extent of at least 95% by weight, of compounds of the formula (I) in which b is not 1.

If the compositions (M) contain catalysts (G), the amounts are preferably 0.01 to 20 parts by weight, more preferably 0.05 to 5 parts by weight, based in each case on 100 parts by weight of constituent (A).

Any adhesion promoters (H) used in the inventive compositions (M) may be any suitable adhesion promoters for systems that cure through silane condensation.

Preferably, the adhesion promoters (H) are alkoxysilanes which have at least one SiC-bonded, reactive organic function, for example, glycidoxyalkyl-, carbamatoalkyl-, and methacryloxyalkyl-alkoxysilanes, and partial hydrolyzates thereof, and which are different than component (D).

Examples of adhesion promoters (H) are epoxy silanes, such as glycidoxypropyltrimethoxysilane, glycidoxypropylmethyldimethoxysilane, glycidoxypropyltriethoxysilane or glycidoxypropylmethyldiethoxysilane, 2-(3-triethoxysilylpropyl)maleic anhydride, N-(3-trimethoxysilylpropyl)urea, N-(3-triethoxysilylpropyl)urea, N-(trimethoxysilylmethyl) urea, N-(methyldimethoxysilylmethyl)urea, N-(3-triethoxysilylmethyl)urea, N-(3-methyldiethoxysilylmethyl)urea, O-(methylcarbamatomethyl)-methyldimethoxysilane, O-(methylcarbamatomethyl)trimethoxysilane, O-(ethylcarbamatomethyl)methyldiethoxysilane, O-(ethylcarbamatomethyl)triethoxysilane, 3-methacryloxypropyltrimethoxysilane, methacryloxymethyltrimethoxysilane, methacryloxymethylmethyldimethoxysilane, methacryloxymethyltriethoxysilane, methacryloxymethylmethyldiethoxysilane, 3-acryloxypropyltrimethoxysilane, acryloxymethyltrimethoxysilane, acryloxymethylmethyldimethoxysilane, acryloxymethyltriethoxysilane, and acryloxymethylmethyldiethoxysilane, and the partial condensates thereof.

If the compositions (M) comprise adhesion promoters (H), the amounts are preferably 0.5 to 30 parts by weight, more preferably 1 to 10 parts by weight, based in each case on 100 parts by weight of component (A).

Any water scavengers (I) used in the compositions (M) may be any suitable water scavengers for systems that cure through silane condensation. Preferably, the water scavengers (I) are alkoxysilanes and the partial hydrolyzates thereof that are different from components (D) and (H).

Examples of water scavengers (I) are silanes such as vinyltrimethoxysilane, vinyltriethoxysilane, vinylmethyldimethoxysilane, O-(methylcarbamatomethyl)methyldimethoxysilane, O-(methylcarbamatomethyl)trimethoxysilane, O-(ethylcarbamatomethyl)methyldiethoxysilane, O-(ethylcarbamatomethyl)-triethoxysilane, and/or the partial condensates thereof, and also orthoesters such as 1,1,1-trimethoxyethane, 1,1,1-triethoxyethane, trimethoxymethane, and triethoxymethane.

If the compositions (M) comprise water scavengers (I), the amounts are preferably 0.5 to 30 parts by weight, more preferably 1 to 20 parts by weight, based in each case on 100 parts by weight of component (A). The inventive compositions preferably comprise component (I).

Any additives (J) used in the compositions (M) may be any suitable typical additives for silane-crosslinking systems. Any additives (J) are preferably antioxidants, UV stabilizers, for example, what are called HALS compounds, fungicides, and pigments.

If the inventive compositions (M) contain additives (J), the amounts are preferably 0.01 to 30 parts by weight, more preferably 0.1 to 10 parts by weight, based in each case on 100 parts by weight of component (A).

Any admixtures (K) are preferably tetraalkoxysilanes, for example, tetraethoxysilane, and/or partial condensates thereof, reactive plasticizers, rheology additives, flame retardants, or organic solvents.

Preferred reactive plasticizers (K) are compounds containing alkyl chains having 6 to 40 carbon atoms and having a group reactive toward the compounds (A). Examples are isooctyltrimethoxysilane, isooctyltriethoxysilane, N-octyltrimethoxysilane, N-octyltriethoxysilane, decyltrimethoxysilane, decyltriethoxysilane, dodecyltrimethoxysilane, dodecyltriethoxysilane, tetradecyltrimethoxysilane, tetradecyltriethoxysilane, hexadecyltrimethoxysilane, and hexadecyltriethoxysilane.

The rheology additives (K) are preferably polyamide waxes, hydrogenated castor oils, or stearates.

Examples of organic solvents (K) are low molecular weight ethers, esters, ketones, aromatic and aliphatic, and optionally halogenated, hydrocarbons and alcohols, preference being given to the latter. Preferably, no organic solvents are added to the compositions (M).

If the compositions (M) contain one or more components (K), the amounts of each are preferably 0.5 to 200 parts by weight, more preferably 1 to 100 parts by weight, especially 2 to 70 parts by weight, based in each case on 100 parts by weight of component (A). All the ingredients of the compositions (M) always add up to 100% by weight.

The compositions are preferably comprising:
(A) 100 parts by weight of compounds of the formula (I),
(B) 5 to 100 parts by weight of fumed silicas comprising:
(B1) hydrophilic fumed silica and
(B2) hydrophobic fumed silica,
with the proviso that (B1) and (B2) are used in a mass ratio of 10:1 to 1:10,
optionally
(C) unreactive plasticizers,
(D) a basic nitrogen-containing compound,
optionally
(E) fillers,
optionally
(F) catalysts,
optionally
(H) adhesion promoters,
optionally
(I) water scavengers,
optionally
(J) additives, and
optionally
(K) admixtures.

The compositions (M) preferably do not contain any further constituents apart from components (A) to (K).

The compositions are more preferably consisting of:
(A) 100 parts by weight of compounds of the formula (I),
(B) 5 to 100 parts by weight of fumed silicas comprising
(B1) hydrophilic fumed silica and
(B2) hydrophobic fumed silica,
with the proviso that (B1) and (B2) are used in a mass ratio of 10:1 to 1:10,
optionally
(C) unreactive plasticizers,
(D) a basic nitrogen-containing compound,
optionally
(F) catalysts,
optionally
(H) adhesion promoters,
optionally
(I) water scavengers,
optionally
(J) additives, and
optionally
(K) admixtures.

The compositions (M) are most preferably consisting of:
(A) 100 parts by weight of silane-terminated polyoxyalkylenes having end groups of the formula (III), where $R^2$ is hydrogen, $R^2$ is a methyl or an ethyl radical, b is 1 or 3, and a is 0 or 1,
(B) 5 to 100 parts by weight of fumed silicas comprising:
(B1) hydrophilic fumed silica and
(B2) hydrophobic fumed silica,
with the proviso that (B1) and (B2) are used in a mass ratio of 10:1 to 1:10,
optionally
(C) unreactive plasticizers,
(D) a basic nitrogen-containing compound containing units of the formula (V),
optionally
(F) catalysts,
optionally
(H) adhesion promoters,
optionally
(I) water scavengers,
optionally
(J) additives, and
optionally
(K) admixtures.

Each of the components may be one kind of a component or a mixture of at least two kinds of a particular component.

The compositions (M) are preferably adhesives or sealants, and preferably have viscosities of 500 to 1,000,000 mPas, more preferably 1,000 to 500,000 mPas, in each case at 25° C.

The compositions (M) can be produced in any suitable manner, for instance, by standard methods and mixing processes for production of moisture-curing compositions.

The invention further provides a method of producing the compositions (M) by mixing the individual components in any desired sequence. Components (B1) and (B2) can be added separately or as a mixture. Preferably, components (B1) and (B2) are added separately in succession or simultaneously, preferably in succession.

This mixing operation can be effected at room temperature and atmospheric pressure, i.e. about 900 to 1,100 hPa. If desired, mixing can alternatively be effected at higher temperatures, for example, at temperatures in the range from 30 to 130° C. In addition to remove volatile compounds and/or air, it is possible to mix the components intermittently or constantly under reduced pressure, for example at absolute pressure of 30 to 500 hPa. The mixing operation of the invention is preferably effected with exclusion of moisture. The method of the invention can be performed continuously or in batches.

The compositions (M) are preferably one-component compositions, which are storable with the exclusion of water and crosslinkable at room temperature when combined with water. Alternatively, the compositions (M) may be part of two-component crosslinking systems, in which OH-containing compounds such as water are added in a second component.

The typical water content of air is sufficient for the crosslinking of the compositions (M). The compositions (M) are preferably crosslinked at room temperature. The compositions (M) can, if desired, also be crosslinked at higher or lower temperatures than room temperature, for example at −5 to 15° C. or at 30 to 50° C. It is possible, but not preferable, for the water content to be below the typical water content in air since the curing would then take longer. Preference is given to conducting the crosslinking at a pressure of 100 to 1,100 hPa, especially at the atmospheric pressure, i.e. about 900 to 1,100 hPa.

The invention further provides moldings produced by crosslinking the compositions (M). The moldings may be any desired moldings, for instance, seals, pressed articles, extruded profiles, coatings, impregnations, encapsulations, lenses, prisms, polygonal structures, laminate layers, or adhesive layers.

The invention further provides a method for bonding substrates, in which the inventive composition is applied to the surface of at least one substrate, this surface is then contacted with the second substrate to be bonded, and then left to crosslink.

The invention further provides a method of sealing substrates or sealing joints and gaps between two substrates, in which the inventive composition is applied to the surface of at least one substrate or introduced into a joint between two substrates, and then left to crosslink.

Examples of substrates which can be bonded or sealed in accordance with the invention are polymers including PVC, concrete, mineral substrates, metals, glass, ceramic, wood and painted surfaces. It is possible to bond or seal either identical or different materials to one another.

The compositions (M) have the advantage that they can be produced from easily and readily commercially available and inexpensive materials, especially from the commercially available silane-crosslinking polymers, for example, the various GENIOSIL® STP-E products from Wacker Chemie AG.

The crosslinkable compositions (M) have the following advantages of featuring very high storage stability, a high crosslinking rate, an excellent adhesion profile being easily processable, and having an easily smoothable surface. Furthermore, the crosslinkable compositions (M) have the advantage that adhesives and sealants produced therefrom have good thixotropy and firmness. The firmness is maintained even after high shear, as can occur, for example, when the adhesive or sealant is discharged from its storage container.

In the examples described hereinafter, all the viscosity figures relate to a temperature of 25° C. Unless stated otherwise, the examples which follow are conducted at atmospheric pressure, i.e. at about 1,000 hPa, and at room temperature, i.e. at about 23° C., or at a temperature of the reactants at room temperature without additional heating or cooling, and at a relative air humidity of about 50%. In addition, all figures for parts and percentages, unless stated otherwise, are based on weight.

EXAMPLE 1

Production of a transparent adhesive formulation 98.5 g of a linear polypropylene glycol having silane termination at both ends and having an average molar mass ($M_n$) of 18,000 g/mol and end groups of the formula —O—C(=O)—NH—($CH_2$)—Si($CH_3$) ($OCH_3$)$_2$ (commercially available as GENIOSIL® STP-E30 from Wacker Chemie AG) are homogenized in a laboratory planetary mixer from PC-Laborsystem, equipped with two beam mixers, at 25° C. together with 4.0 g of vinyltrimethoxysilane, 67.1 g of diisononyl cyclohexane-1,2-dicarboxylate (commercially available as "Hexamoll DINCH" from BASF AG, Ludwigshafen, Germany), 1.6 g of UV stabilizer (commercially available as HOSTAVIN® 3206 liq. from Clariant Produkte GmbH, Frankfurt a.M., Germany; CAS No.: 82493-14-9), and 0.6 g of HALS stabilizer (commercially available as TINUVIN® 123 from BASF AG, Ludwigshafen, Germany; CAS No.: 129757-67-1) at 200 rpm for 2 minutes. Thereafter, 12.15 g of a hydrophilic fumed silica having a BET surface area of about 200 m$^2$/g (commercially available as HDK® N20: Wacker Chemie AG, Munich, Germany) and 12.15 g of a hydrophobic fumed silica having a BET surface area of about 200 m$^2$/g (HDK® H18, commercially available from Wacker Chemie AG, Munich, Germany) are mixed in at 600 rpm for one minute while stirring. Finally, 4.0 g of 3-aminopropyltrimethoxysilane are mixed in at 200 rpm for one minute. In the final step, the mixture is homogenized at 600 rpm for 2 minutes and at 200 rpm for 1 minute at a pressure of 100 mbar, and stirred to release bubbles. The composition thus obtained is dispensed into 310 ml PE cartridges and stored at 20° C. for 24 hours prior to analysis.

COMPARATIVE EXAMPLE 1 (C1)

Production of a Transparent Adhesive Formulation 98.3 g of a linear polypropylene glycol having silane termination at both ends and having an average molar mass ($M_n$) of 18,000 g/mol and end groups of the formula —O—C(=O)—NH—($CH_2$)—Si($CH_3$) ($OCH_3$)$_2$ (commercially available as GENIOSIL® STP-E30 from Wacker Chemie AG) are homogenized in a laboratory planetary mixer from PC-Laborsystem, equipped with two beam mixers, at 25° C. together with 4.0 g of vinyltrimethoxysilane, 67.1 g of diisononyl cyclohexane-1,2-dicarboxylate (commercially available as "Hexamoll DINCH" from BASF AG, Ludwigshafen, Germany), 1.6 g of UV stabilizer (commercially available as TINUVIN® 400 from BASF AG, Ludwigshafen, Germany; CAS No.: 153519-44-9) and 0.6 g of HALS stabilizer (commercially available as TINUVIN® 292 from BASF AG, Ludwigshafen, Germany; CAS No.: 41556-26-7 and 82919-37-7) at 200 rpm for 2 minutes. Thereafter, 24.3 g of a hydrophobic fumed silica having a BET surface area of about 200 m$^2$/g, a methanol number of 70-80, and carbon content of 4-4.5% by weight (HDK® H18, commercially available from Wacker Chemie AG, Munich, Germany) is mixed in while stirring at 600 rpm for 1 minute. In the final step 4.0 g of 3-aminopropyltrimethoxysilane are mixed in at 200 rpm for 1 minute. Finally, the mixture is homogenized at 600 rpm for 2 minutes and at 200 rpm for 1 minute at a pressure of 100 mbar, and stirred to release bubbles. The composition thus obtained is dispensed into 310 ml PE cartridges and stored at 20° C. for 24 hours prior to analysis.

EXAMPLE 2

Production of a Transparent Adhesive Formulation 101 g of a linear polypropylene glycol having silane termination at both ends and having an average molar mass ($M_n$) of 18,000 g/mol and end groups of the formula —O—C(=O)—NH—($CH_2$)—Si($CH_3$)($OCH_3$)$_2$ (commercially available as GENIOSIL® STP-E30 from Wacker Chemie AG) are homogenized in a laboratory planetary mixer from PC-Laborsystem, equipped with two beam mixers, at 25° C. together with 4.0 g of vinyltrimethoxysilane, 69.8 g of diisononyl cyclohexane-1,2-dicarboxylate (commercially available as "Hexamoll DINCH" from BASF AG, Ludwigshafen, Germany), 1.6 g of UV stabilizer (commercially available as TINUVIN® 400 name BASF AG, Ludwigshafen, Germany; CAS No.: 153519-44-9) and 0.6 g of HALS stabilizer (commercially available as TINUVIN® 123 name BASF AG, Ludwigshafen, Germany; CAS No.: 129757-67-1) at 200 rpm for 2 minutes. Thereafter, 9.5 g of a hydrophilic fumed silica having a BET surface area of about 200 m$^2$/g, a methanol number of 0, and carbon content of 0% by weight (HDK® N20, commercially available from Wacker Chemie AG, Munich, Germany) and 9.5 g of a hydrophobic fumed silica having a BET surface area of about 200 m$^2$/g, a methanol number of 70-80, and carbon content of 4-4.5% by weight (HDK® H18, commercially available from Wacker Chemie AG, Munich, Germany) are mixed in while stirring at 600 rpm for 1 minute. Finally, 4.0 g of 3-aminopropyltrimethoxysilane are mixed in at 200 rpm for 1 minute. In the final step, the mixture is homogenized at 600 rpm for 2 minutes and at 200 rpm for 1 minute at a pressure of 100 mbar, and stirred to release bubbles. The composition thus obtained is dispensed into 310 ml PE cartridges and stored at 20° C. for 24 hours prior to analysis.

EXAMPLE 3

Production of a transparent adhesive formulation 50.5 g of a linear polypropylene glycol having silane termination at both ends and having an average molar mass ($M_n$) of 18,000 g/mol and end groups of the formula —O—C(=O)—NH—(CH$_2$)—Si(CH$_3$) (OCH$_3$)$_2$ (commercially available as GENIOSIL® STP-E30 from Wacker Chemie AG) and 50.5 g of a linear polypropylene glycol having silane termination at both ends and having an average molar mass ($M_e$) of 18,000 g/mol and end groups of the formula —O—C(=O)—NH—(CH$_2$)$_3$—Si(OCH$_3$)$_3$ (commercially available as GENIOSIL® STP-E35 from Wacker Chemie AG) are homogenized in a laboratory planetary mixer from PC-Laborsystem, equipped with two beam mixers, at 25° C. together with 4.0 g of vinyltrimethoxysilane, 69.8 g of diisononyl cyclohexane-1,2-dicarboxylate (commercially available as "Hexamoll DINCH" from BASF AG, Ludwigshafen, Germany), 1.6 g of UV stabilizer (commercially available as TINUVIN® 400 from BASF AG, Ludwigshafen, Germany; CAS No.: 153519-44-9) and 0.6 g of HALS stabilizer (commercially available as TINUVIN® 123 from BASF AG, Ludwigshafen, Germany; CAS No.: 129757-67-1) at 200 rpm for 2 minutes. Thereafter, 9.5 g of a hydrophilic fumed silica having a BET surface area of about 200 m$^2$/g, a methanol number of 0, and carbon content of 0% by weight (HDK® N20, commercially available from Wacker Chemie AG, Munich, Germany) and 9.5 g of a hydrophobic fumed silica having a BET surface area of about 200 m$^2$/g, a methanol number of 70-80, and carbon content of 4-4.5% by weight (HDK® H18, commercially available from Wacker Chemie AG, Munich, Germany) are mixed in while stirring at 600 rpm for 1 minute. In the final step, 4.0 g of 3-aminopropyltrimethoxysilane are mixed in at 200 rpm for 1 minute. Finally, the mixture is homogenized at 600 rpm for 2 minutes and at 200 rpm for 1 minute at a pressure of 100 mbar, and stirred to release bubbles. The composition thus obtained is dispensed into 310 ml PE cartridges and stored at 20° C. for 24 hours prior to analysis.

EXAMPLE 4

Production of an adhesive formulation 50.5 g of a linear polypropylene glycol having silane termination at both ends and having an average molar mass ($M_n$) of 12,000 g/mol and end groups of the formula —O—C(=O)—NH—(CH$_2$)—Si(CH$_3$) (OCH$_3$)$_2$ (commercially available as GENIOSIL® STP-E10 from Wacker Chemie AG) and 50.5 g of a linear polypropylene glycol having silane termination at both ends and having an average molar mass ($M_n$) of 18 000 g/mol and end groups of the formula —O—C(=O)—NH—(CH$_2$)$_3$—Si(OCH$_3$)$_3$ (commercially available as GENIOSIL® STP-E35 from Wacker Chemie AG) are homogenized in a laboratory planetary mixer from PC-Laborsystem, equipped with two beam mixers, at 25° C. together with 4.0 g of vinyltrimethoxysilane, 69.8 g of diisononyl cyclohexane-1,2-dicarboxylate (commercially available as "Hexamoll DINCH" from BASF AG, Ludwigshafen, Germany), 1.6 g of UV stabilizer (commercially available as TINUVIN® 400 from BASF AG, Ludwigshafen, Germany; CAS No.: 153519-44-9) and 0.6 g of HALS stabilizer (commercially available as TINUVIN® 123 from BASF AG, Ludwigshafen, Germany; CAS No.: 129757-67-1) at 200 rpm for 2 minutes. Thereafter, 9.5 g of a hydrophilic fumed silica having a BET surface area of about 200 m$^2$/g, a methanol number of 0, and carbon content of 0% by weight (HDK® N20, commercially available from Wacker Chemie AG, Munich, Germany) and 9.5 g of a hydrophobic fumed silica having a BET surface area of about 200 m$^2$/g, a methanol number of 70-80, and carbon content of 4-4.5% by weight (HDK® H18, commercially available from Wacker Chemie AG, Munich, Germany) are mixed in while stirring at 600 rpm for 1 minute. Finally, 4.0 g of 3-aminopropyltrimethoxysilane are mixed in at 200 rpm for 1 minute. In the final step, the mixture is homogenized at 600 rpm for 2 minutes and at 200 rpm for 1 minute at a pressure of 100 mbar, and stirred to release bubbles. The composition thus obtained is dispensed into 310 ml PE cartridges and stored at 20° C. for 24 hours prior to analysis.

EXAMPLE 5

The compositions obtained in examples 1, C1, 2, 3, and 4 are examined in terms of their rheological properties prior to curing, their skin formation time, and their mechanical properties after curing.

Rheological Properties

To determine the rheological properties, in accordance with DIN 54458, the yield point $\tau_f$ is determined. This value is shear stress at the point of intersection of the curves of storage modulus G' and loss modulus G", the storage modulus G' describing the energy absorbed reversibly (i.e. through elastic deformation) and the loss modulus G" describing the energy spent irreversibly (i.e. through plastic deformation). Thus, the so-called yield point $\tau_f$ is an approximation of the shear stress which causes a substance to flow. The higher the yield point $\tau_f$, the firmer the corresponding composition. The yield point $\tau_f$ is determined once with untreated samples of the compositions obtained in examples 1, C1, 2, 3, and 4. In a second measurement series, the corresponding samples are first subjected to shear stress in a Speedmixer from Hauschild (D-59065 Hamm) at 2,500 revolutions/min at about 25° C. for 60 s. This is followed by the determination of the yield point $\tau_f$ within 60 min. The results can be found in Table 1.

Skin Formation Time (SFT)

To determine the skin formation time, the crosslinkable compositions obtained in the examples are applied to a cardboard in a bead 2 mm thick and stored under standard climatic conditions (23° C. and 50% relative air humidity). During the curing, the formation of a skin is tested at regular time intervals. For this purpose, a sharpened pencil (hardness HB) is carefully applied to the surface of the sample and pulled upward. If the sample remains stuck to the pencil, no skin has formed yet. If no sample remains stuck to the pencil, a skin has formed and the time is noted. The results can be found in table 1.

Mechanical Properties

The compositions are each spread onto milled-out Teflon sheets 2 mm deep and cured at 23° C. and 50% rel. air humidity for 2 weeks. Subsequently, breaking strength, DIN 53504-S1, elongation at break, DIN 53504-S1, and Shore A hardness, DIN 53505 are determined. The results can be found in table 1.

TABLE 1

|  | Adhesive formulation | | | | |
| --- | --- | --- | --- | --- | --- |
|  | 1 | C1 | 2 | 3 | 4 |
| Content of hydrophilic silica [% by wt.] | 6.1 | 0 | 4.75 | 4.75 | 4.75 |
| Content of hydrophobic silica [% by wt.] | 6.1 | 12.2 | 4.75 | 4.75 | 4.75 |
| Rheological properties | | | | | |
| Yield point without prior shear [Pa] | 11,300 | 5,600 | 6,500 | 6,400 | 5,200 |
| Yield point after prior shear [Pa] | 8,500 | <100 | 5,800 | 6,100 | 5,000 |
| Curing properties | | | | | |
| Skin formation time [min] | 20 | 40 | 31 | 25 | 29 |
| Mechanical properties | | | | | |
| Breaking strength [MPa] | 2.5 | 2.6 | 2.1 | 1.8 | 1.6 |
| Elongation at break [%] | 347 | 461 | 424 | 281 | 208 |
| Shore A hardness | 35 | 33 | 22 | 27 | 31 |

The invention claimed is:

1. A composition comprising:
(A) 100 parts by weight of at least one silane-crosslinking polymer of the formula $$Y-[(CR^1{}_2)_b-SiR_a(OR^2)_{3-a}]_x \qquad (I),$$

where
Y is an x-valent, nitrogen-, oxygen-, sulfur-, or carbon-bonded polymer radical containing at least one polyether unit or at least one polyester unit,
R each individually is a monovalent, optionally substituted hydrocarbyl radical,
$R^1$ each individually is hydrogen or a monovalent, optionally substituted hydrocarbyl radical, optionally bonded to carbon via nitrogen, phosphorus, oxygen, sulfur, or a carbonyl group,
$R^2$ each individually is hydrogen or a monovalent, optionally substituted hydrocarbyl radical,
x is an integer from 1 to 10,
a each individually is 0, 1, or 2 and,
b each individually is an integer from 1 to 10, and
(B) 5 to 100 parts by weight of fumed silica comprising
(B1) hydrophilic fumed silica and
(B2) hydrophobic fumed silica,
with the proviso that (B1) and (B2) are used in a mass ratio of 10:1 to 1:10.

2. The composition of claim 1, wherein the Y radical in formula (I) comprises x-valent, nitrogen-, oxygen-, sulfur-, or carbon-bonded polyether group-containing polyurethane radicals or polyoxyalkylene radicals.

3. The composition of claim 1, wherein the composition contains component (B) in an amount of 15 to 50 parts by weight, based on 100 parts by weight of component (A).

4. The composition of claim 1, wherein the composition further comprises:
(A) optionally at least one unreactive plasticizer,
(B) at least one basic nitrogen-containing compound,
(C) optionally at least one filler,
(D) optionally at least one catalyst,
(E) optionally at least one adhesion promoter,
(I) optionally at least one water scavenger,
(J) optionally at least one additive and/or
(K) optionally at least one admixtures.

5. The composition of claim 1, wherein the composition consists of:
(A) 100 parts by weight of silane-terminated polyoxyalkylenes having end groups of the formula $$-O-C(=O)-NH-(CR^1{}_2)_b-SiR_a(OR^2)_{3-a} \qquad (III)$$

where $R^1$ is hydrogen, $R^2$ is a methyl or an ethyl radical, b is 1 or 3, and a is 0 or 1,
(B) 5 to 100 parts by weight of fumed silicas comprising
(B1) hydrophilic fumed silica and
(B2) hydrophobic fumed silica,
with the proviso that (B1) and (B2) are used in a mass ratio of 10:1 to 1:10,
(C) optionally at least one unreactive plasticizer,
(D) at least one basic nitrogen-containing compound containing units of the formula (V), $$D_cSi(OR^3)_dR^4{}_eO_{(4-c-d-e)/2} \qquad (V)$$

in which
$R^3$ are identical or different and are hydrogen or optionally substituted hydrocarbyl radicals,
D are identical or different and are monovalent, SiC-bonded radicals containing basic nitrogen,
$R^4$ are identical or different and are monovalent, optionally substituted SiC-bonded organic radicals free of basic nitrogen,
c is 0, 1, 2, 3, or 4,
d is 0, 1, 2, or 3, and
e is 0, 1, 2, or 3,
with the proviso that the sum total of c+d+e is less than or equal to 4 and at least one D radical per molecule is present,
(E) optionally, one or more silicone resins,
(F) optionally, one or more catalysts,
(H) optionally, one or more adhesion promoters,
(I) optionally, one or more water scavengers,
(J) optionally, one or more additives selected from the group consisting of antioxidants, UV stabilizers, fungicides, and pigments, and
(K) optionally one or more admixtures selected from the group consisting of tetraalkoxysilanes and partial hydrolysates thereof, reactive plasticizers, polyamide waxes, hydrogenated castor oils, stearates, flame retardants, and organic solvents.

6. A method of producing a composition of claim 1 by mixing the individual components in any sequence.

7. A shaped body produced by crosslinking the composition of claim 1.

8. A shaped body produced by crosslinking the composition as produced in claim 6.

9. A method of bonding substrates comprising applying a composition of claim 1 to a surface of at least a first substrate, contacting the surface with at least a second substrate to be bonded, and allowing the composition to crosslink.

10. A method of bonding substrates comprising applying a composition as produced in claim 6 to a surface of at least a first substrate, contacting the surface with at least a second substrate to be bonded, and allowing the composition to crosslink.

11. A method of sealing substrates or joints and gaps between at least two substrates, comprising applying a composition of claim 1 is applied to a surface of at least one substrate or introducing into at least one joint between the at least two substrates, and allowing the composition to crosslink.

12. A method of sealing substrates or joints and gaps between at least two substrates, wherein the composition as produced in claim 6 is applied to a surface of at least one substrate or introducing into at least one joint between the at least two substrates, and allowing the composition to crosslink.

13. A composition comprising:
(A) 100 parts by weight of at least one silane-crosslinking polymer of the formula $$Y\text{—}[(CR^1_2)_b\text{—}SiR_a(OR^2)_{3-a}]_x \qquad (I),$$

where
Y is an x-valent, nitrogen-, oxygen-, sulfur-, or carbon-bonded polymer radical containing at least one polyether unit or at least one polyester unit,
R each individually is a monovalent, optionally substituted hydrocarbyl radical,
$R^1$ each individually is hydrogen or a monovalent, optionally substituted hydrocarbyl radical, optionally bonded to carbon via nitrogen, phosphorus, oxygen, sulfur, or a carbonyl group,
$R^2$ each individually is hydrogen or a monovalent, optionally substituted hydrocarbyl radical,
x is an integer from 1 to 10,
a each individually is 0, 1, or 2 and,
b each individually is an integer from 1 to 10, and
(B) 5 to 100 parts by weight of fumed silica comprising
(B1) hydrophilic fumed silica and
(B2) hydrophobic fumed silica,
with the proviso that (B1) and (B2) are used in a mass ratio of 5:1 to 1:5.

14. The composition of claim 13, wherein the Y radical in formula (I) comprises x-valent, nitrogen-, oxygen-, sulfur-, or carbon-bonded polyether group-containing polyurethane radicals or polyoxyalkylene radicals.

15. The composition of claim 3, wherein the composition contains component (B) in an amount of 15 to 50 parts by weight, based on 100 parts by weight of component (A).

16. The composition of claim 4, wherein the composition further comprises:
(A) optionally at least one unreactive plasticizer,
(B) at least one basic nitrogen-containing compound,
(C) optionally at least one filler,
(D) optionally at least one catalyst,
(E) optionally at least one adhesion promoter,
(I) optionally at least one water scavenger,
(J) optionally at least one additive and/or
(K) optionally at least one admixtures.

17. The composition of claim 13, wherein the composition consists of:
(A) 100 parts by weight of silane-terminated polyoxyalkylenes having end groups of the formula $$\text{—}O\text{—}C(=O)\text{—}NH\text{—}(CR^1_2)_b\text{—}SiR_a(OR^2)_{3-a} \qquad (III)$$

where $R^1$ is hydrogen, $R^2$ is a methyl or an ethyl radical, b is 1 or 3, and a is 0 or 1,
(B) 5 to 100 parts by weight of fumed silicas comprising
(B1) hydrophilic fumed silica and
(B2) hydrophobic fumed silica,
with the proviso that (B1) and (B2) are used in a mass ratio of 10:1 to 1:10,
(C) optionally one or more unreactive plasticizers,
(D) optionally, one or more basic nitrogen-containing compound containing units of the formula (V), $$D_c Si(OR^3)_d R^4_e O_{(4-c-d-e)/2} \qquad (V)$$

in which
$R^3$ are identical or different and are hydrogen or optionally substituted hydrocarbyl radicals,
D are identical or different and are monovalent, SiC-bonded radicals containing basic nitrogen,
$R^4$ are identical or different and are monovalent, optionally substituted SiC-bonded organic radicals free of basic nitrogen,
c is 0, 1, 2, 3, or 4,
d is 0, 1, 2, or 3, and
e is 0, 1, 2, or 3,
with the proviso that the sum total of c+d+e is less than or equal to 4 and at least one D radical per molecule is present,
(E) optionally, one or more silicone resins,
(F) optionally, one or more catalysts,
(H) optionally, one or more adhesion promoters,
(I) optionally, one or more water scavengers,
(J) optionally, one or more additives selected from the group consisting of antioxidants, UV stabilizers, fungicides, and pigments, and
(K) optionally one or more admixtures selected from the group consisting of tetraalkoxysilanes and partial hydrolysates thereof, reactive plasticizers, polyamide waxes, hydrogenated castor oils, stearates, flame retardants, and organic solvents.

18. A method of producing a composition of claim 13 by mixing the individual components in any sequence.

19. A shaped body produced by crosslinking the composition of claim 13.

20. A method of bonding substrates comprising applying a composition of claim 13 to a surface of at least a first substrate, contacting the surface with at least a second substrate to be bonded, and allowing the composition to crosslink.

21. The composition of claim 1, which is transparent.

* * * * *